United States Patent

Isobe et al.

[11] Patent Number: 5,867,759
[45] Date of Patent: Feb. 2, 1999

[54] COLOR IMAGE FORMING APPARATUS WITH POSITIONAL DEVIATION DETECTING PATTERN AND METHOD THEREFOR

[75] Inventors: Takundo Isobe, Kawasaki; Ken-ichirou Asada, Ohta-Ku Tokyo; Nobuyuki Satoh; Kazuyuki Futami, both of Yokohama; Toshio Shimazaki, Tokyo; Hideaki Sugata, Kawasaki; Hiroshi Ono, Yokohama, all of Japan

[73] Assignee: Ricoh Company, Ltd., Tokyo, Japan

[21] Appl. No.: 909,705

[22] Filed: Aug. 8, 1997

[30] Foreign Application Priority Data

Aug. 30, 1996 [JP] Japan ................................ 8-231037

[51] Int. Cl.$^6$ ................................................ G03G 15/01
[52] U.S. Cl. ........................... 399/301; 399/299; 399/303
[58] Field of Search ..................................... 399/299, 301, 399/303, 302, 312

[56] References Cited

U.S. PATENT DOCUMENTS

| | | |
|---|---|---|
| 4,796,037 | 1/1989 | Takada et al. . |
| 4,914,459 | 4/1990 | Mama et al. . |
| 4,939,550 | 7/1990 | Takada et al. . |
| 4,970,552 | 11/1990 | Okamoto et al. . |
| 5,452,073 | 9/1995 | Kataoka ................................. 399/299 |
| 5,499,092 | 3/1996 | Sasaki ..................................... 399/302 |
| 5,523,823 | 6/1996 | Ashikaga ........................... 399/301 X |
| 5,550,625 | 8/1996 | Takamatsu et al. .................... 399/301 |

FOREIGN PATENT DOCUMENTS

| | | |
|---|---|---|
| 63-278074 | 11/1988 | Japan . |
| 63-279270 | 11/1988 | Japan . |
| 63-279273 | 11/1988 | Japan . |
| 63-286864 | 11/1988 | Japan . |
| 63-286866 | 11/1988 | Japan . |
| 4-337754 | 11/1992 | Japan . |

*Primary Examiner*—S. Lee
*Attorney, Agent, or Firm*—Cooper & Dunham LLP

[57] ABSTRACT

A color image forming apparatus for superimposing images formed on a plurality of photoconductive elements onto a copy sheet includes a sensor for reading a transfer member and a positional deviation detecting pattern formed on the transfer member, a memory for storing information relating to an area having no roughness, such as a scar, on the transfer member, a detector for detecting the area having no roughness on the basis of a signal read by the sensor and for causing the memory to store the information relating to the area, and a color deviation corrector for correcting color deviation on the basis of the signal generated by the sensor reading the positional deviation detecting pattern. The positional deviation detecting pattern is formed at an area of the transfer member having no roughness.

12 Claims, 11 Drawing Sheets

FIG. 5(b) PROPER DETECTING PATTERN

FIG. 5(a) SCAR PATTERN

PROPER DETECTING PATTERN

FIG. 7(a)

NOISE PATTERN

COLOR IMAGE FORMING APPARATUS WITH POSITIONAL DEVIATION DETECTING PATTERN AND METHOD THEREFOR

BACKGROUND OF THE INVENTION

1. Field of the Invention

The present invention relates to a color image forming apparatus for superimposing images formed on a plurality of photoconductive elements onto a transfer member. More particularly, the present invention relates to a color image forming apparatus that prevents color image deviation by forming a color detecting pattern on a transfer member.

2. Background

Conventionally, in a digital color image forming apparatus having a plurality of photoconductive elements, color images are respectively written on each of the photoconductive elements and then superimposed. Therefore, a positional deviation of the color images tends to occur due to curvature of an image scanning line, inclination of the image scanning line, and magnification error, from variations in the accuracy of the mechanical position of each of the photoconductive elements, in the positional accuracy of image writing onto each of the photoconductive elements, in the quality of the writing lens itself, and from fluctuations in writing position and magnification, or the like, of the entire digital color image forming apparatus caused by a speed error of the photoconductive elements and temperature variations thereof. Consequently, these phenomena appear as a color unevenness and/or a color positional deviation, and are factors that degrade image quality.

A method for obtaining an image in which the above-mentioned deviations are corrected is disclosed, for example, in Japanese Laid-Open Patent Application No. 278074/1988, and Japanese Laid-Open Patent Application No. 279270/1988. In these Applications, there is proposed a method in which reflection-type sensors are mounted on each photoconductive element and deviation is detected by detecting a time lag between the detection time of each of the sensors. Another method, for example, disclosed in Japanese Laid-Open Patent Application No. 286864/1988, forms a pattern with a horizontal line and a slanting line on a transfer member and measures the arrival time of each of the lines to a reflection-type sensor on each photoconductor and the magnification in a main scanning direction, and then corrects a clock and a write starting position. Still another method, for example, disclosed in Japanese Laid-Open Patent Application No. 286866/1988 and Japanese Laid-Open Patent Application No. 279273/1988, converts output data from the reflection-type sensor of each photoconductive element into binary data, and by calculating a central value, the effect of variations in the width of a line, which causes variations in the detecting time of the sensor, is reduced.

However, the aforementioned method of detecting positional deviation sometimes produces errors because it utilizes a transfer belt that may have a roughness such as a scar thereon. Therefore, as a solution to the above problem, a method has been proposed in which a positional deviation detecting pattern is compared with a surface state such as a scar or the like on the transfer belt, by initially reading the surface state and then storing related information in a memory, as disclosed in Japanese Laid-Open Patent Application No. 337754/1992.

However, the aforementioned conventional method requires a large-capacity memory because the surface state, such as a scar or the like on the transfer belt, must be initially read and the related information must be stored in the memory. Also, calculations are complex because the surface state must be compared with the positional deviation detecting pattern. Consequently, the above conventional method has the problem of increased manufacturing costs.

SUMMARY OF THE INVENTION

In view of the above-mentioned considerations, it is an object of the present invention to provide a color image forming apparatus for preventing color positional deviations without requiring a large-capacity memory for storing data relating to a surface state of a transfer member, such as a data relating to a scar or the like, and without requiring complex calculations for comparing the surface state of the transfer member with a positional deviation detecting pattern.

This simplifies the calculations performed by a computer included in the apparatus, reduces the amount of memory required and, as a result, reduces the manufacturing costs.

A sensor is provided for reading the transfer member and the positional deviation detecting pattern formed on the transfer member.

A memory stores information relating to an area having no roughness on the transfer member.

A detector detects the area having no roughness on the basis of a signal read by the sensor, and causes the memory to store the information relating to the area therein.

A color deviation corrector is provided for correcting a color deviation on the basis of the signal produced when the positional deviation detecting pattern is read by the sensor, with the positional deviation detecting pattern being formed at the area of the transfer member having no roughness.

BRIEF DESCRIPTION OF THE DRAWINGS

A more complete appreciation of the invention and the attendant advantages thereof will be readily obtained by referring to the following detailed description when considered in connection with the accompanying drawings, wherein:

FIG. 7 (a) shows a noise pattern detected by the positional deviation detecting sensor according to the second embodiment of the present invention;

DESCRIPTION OF THE PREFERRED EMBODIMENTS

Figure 1:
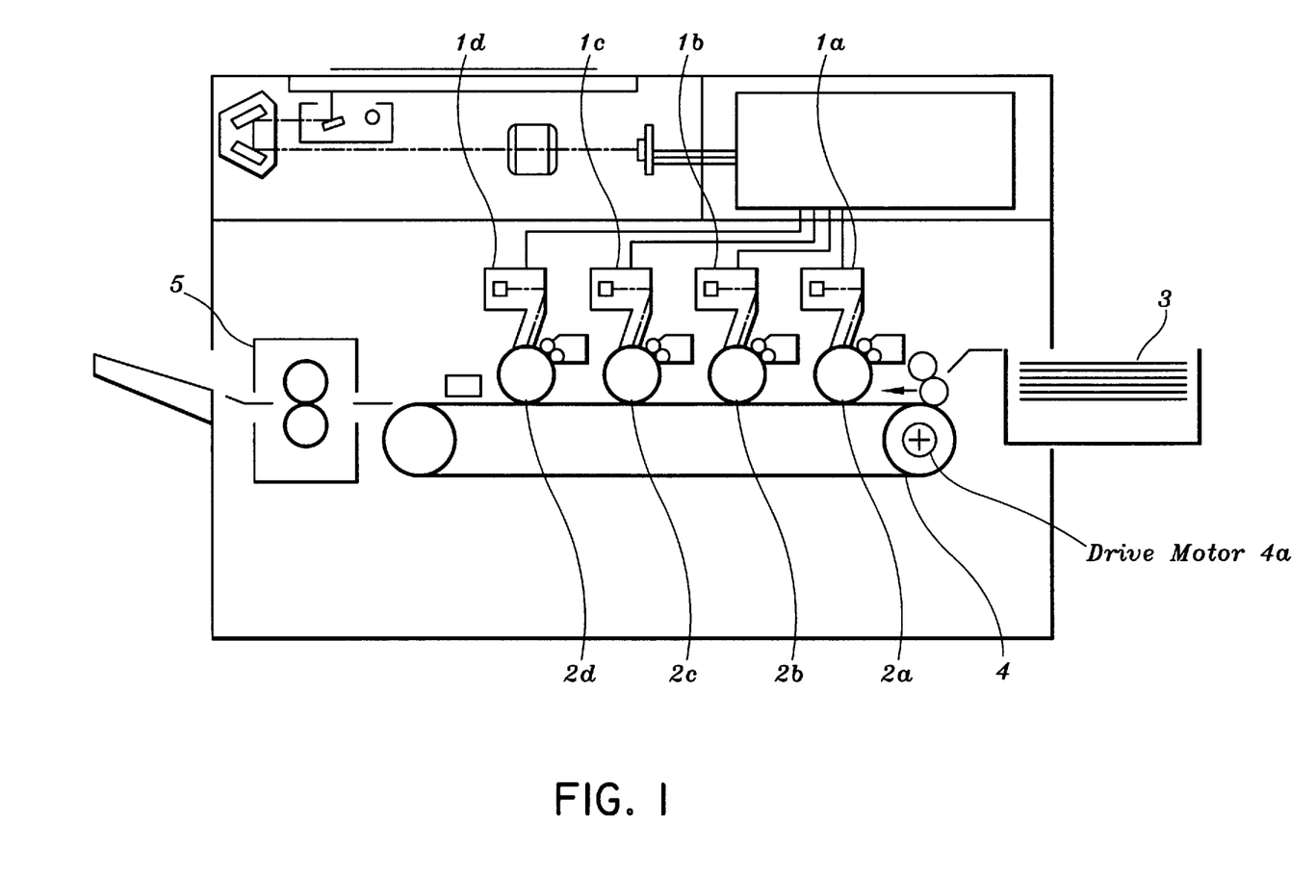
FIG. 1 is a schematic of a color image forming apparatus according to a first embodiment of the present invention.

Embodiments of the present invention are explained hereinbelow with reference to the accompanying figures.
First Embodiment FIG. 1 shows a color image forming apparatus, including optical writing units 1a, 1b, 1c, and 1d for a black image (K), magenta image (M), yellow image (Y), and cyan image (C), respectively, and photoconductive elements (and image forming process units) 2a, 2b, 2c, and 2d for K, M, Y, and C, respectively, for forming multiple color images. Latent images for K, M, Y, and C are formed on the photoconductive elements 2a, 2b, 2c, and 2d, and then each of the images on the photoconductive elements 2a, 2b, 2c, and 2d are developed by toners for K, M, Y, and C.

A copy sheet (hereinbelow called "sheet") is fed from a sheet feeding cassette 3, and conveyed by an endless transfer belt 4 and its drive motor 4a towards an image forming section. The photoconductive elements 2a, 2b, 2c, and 2d are disposed in order along the transfer belt 4, and each of the toner images formed on the photoconductive elements 2a, 2b, 2c, and 2d are superimposed onto the sheet conveyed by the transfer belt 4. The sheet is discharged from the apparatus after the superimposed toner images are melted/fixed by a fixing unit 5.

Figure 2:
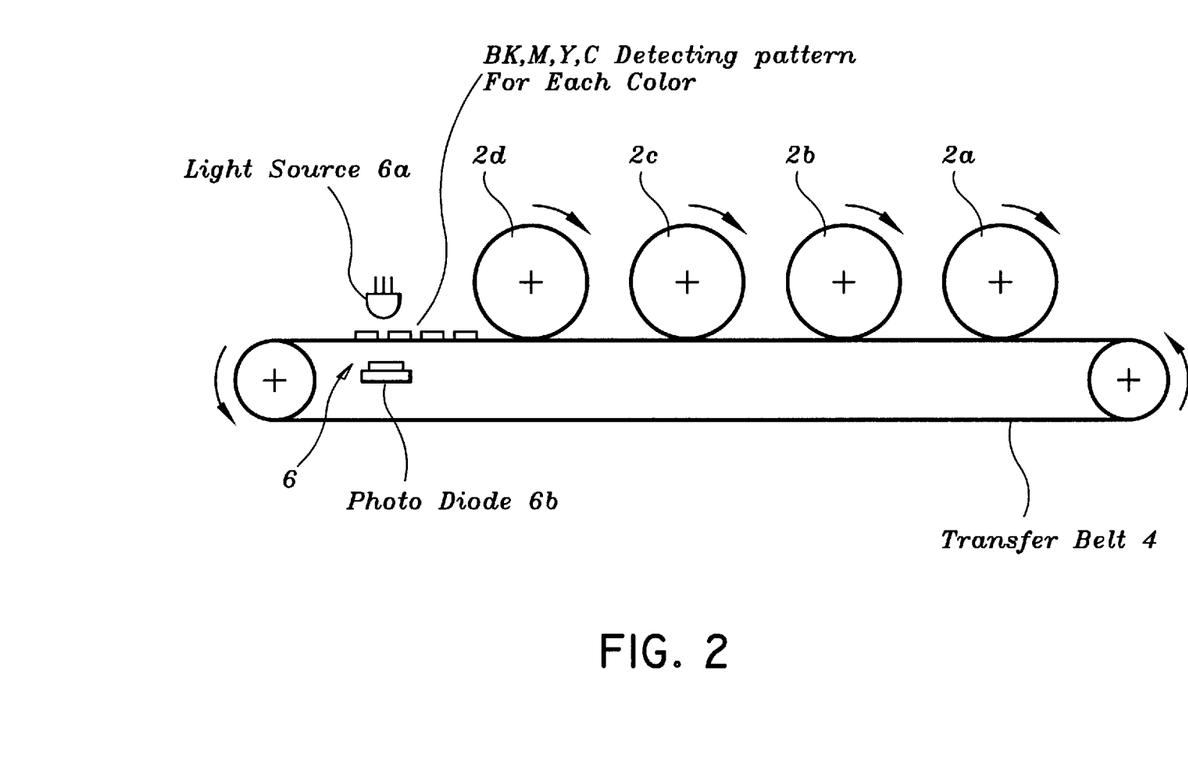
FIG. 2 an illustration for explaining a detecting pattern for detecting a color positional deviation.

In the construction as described above, if the positions of the toner images for K, M, Y, and C superimposed onto the sheet conveyed by the transfer belt 4 have a positional deviation relative to each other, a desired color image cannot be produced. Therefore, for each of the latent images, a positional deviation detecting pattern P is formed on the photoconductive elements 2a through 2d by the optical writing units 1a through 1d, as shown in FIG. 2, and then the latent images are respectively developed by developing units (not shown). The developed images are then transferred onto the transfer belt 4, and the patterns P move downstream according to the movement of the transfer belt 4. The positional deviation detecting patterns P are detected by a positional deviation detecting sensor 6. Because an image forming timing and an image forming position of each color is actually known or can be theoretically determined, positional deviation can be detected by comparing a theoretical value with the actual positional deviation detecting pattern on the transfer belt 4.

The positional deviation detecting sensor 6 is, for example, a transmission type sensor constructed of a light source 6a disposed above the transfer belt 4 and a photodiode 6b for detecting the light from the light source 6a transmitted through the transfer belt 4. However, the positional deviation detecting sensor 6 is not limited to such a construction and any type of sensor, such as a CCD (Charge Coupled Device) sensor, a reflection type sensor, or the like, may be used instead of the transmission type sensor for detecting the positional deviation detecting pattern P and/or a scar on the transfer belt 4.

Figure 3:
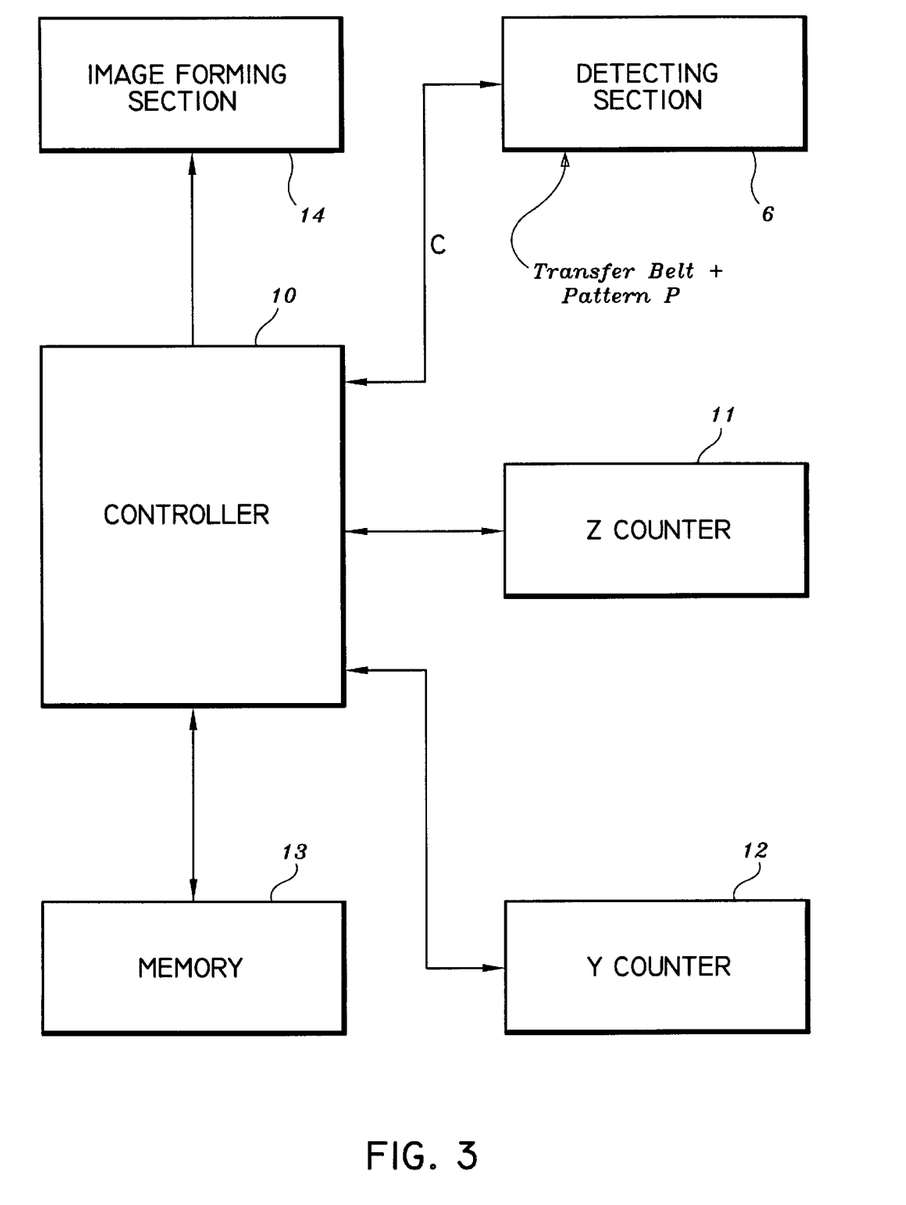
FIG. 3 is a block diagram of the color image forming apparatus of FIG. 1.
Figure 5A:
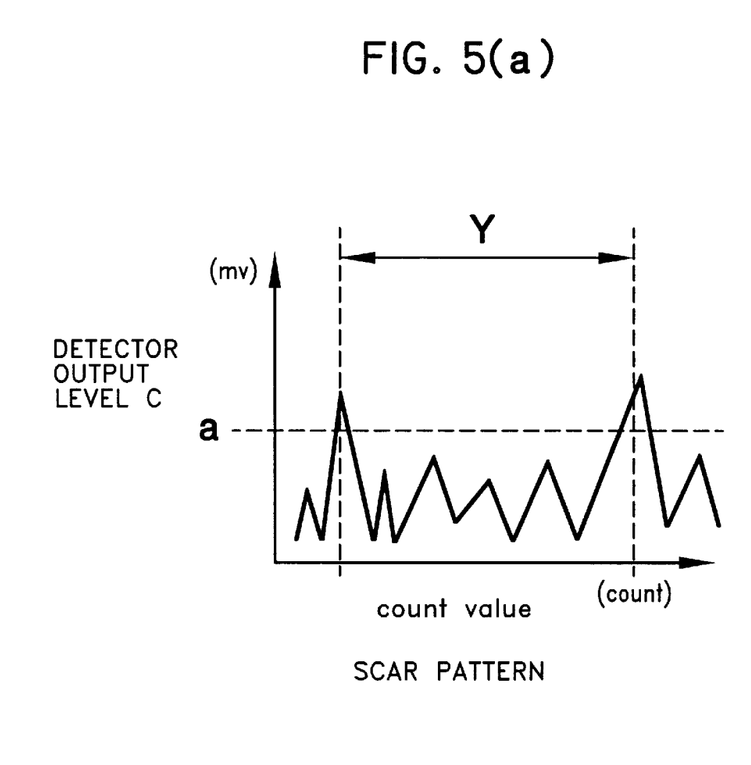
FIG. 5(a) shows a signal of a scar pattern detected by a positional deviation detecting sensor.

In FIG. 3, the positional deviation detecting sensor 6 detects the positional deviation detecting pattern P on the transfer belt 4, and an amount of transmitted light through the transfer belt 4 (output C) is detected and output to the controller 10 so that any roughness, such as from a scar or the like, on the transfer belt 4 can be determined. A Z counter 11 measures or counts a distance moved Z of the transfer belt 4 under the control of the controller 10, and a Y counter 12 measures or counts a distance Y in which no scars are on the transfer belt 4 under the control of the controller 10, as shown in FIG. 5(a). A memory 13 stores the distance moved Z of the transfer belt 4. An image forming section 14 forms the positional deviation detecting pattern P on the transfer belt 4 under the control of the controller 10, as shown in FIG. 3.

Figure 4:
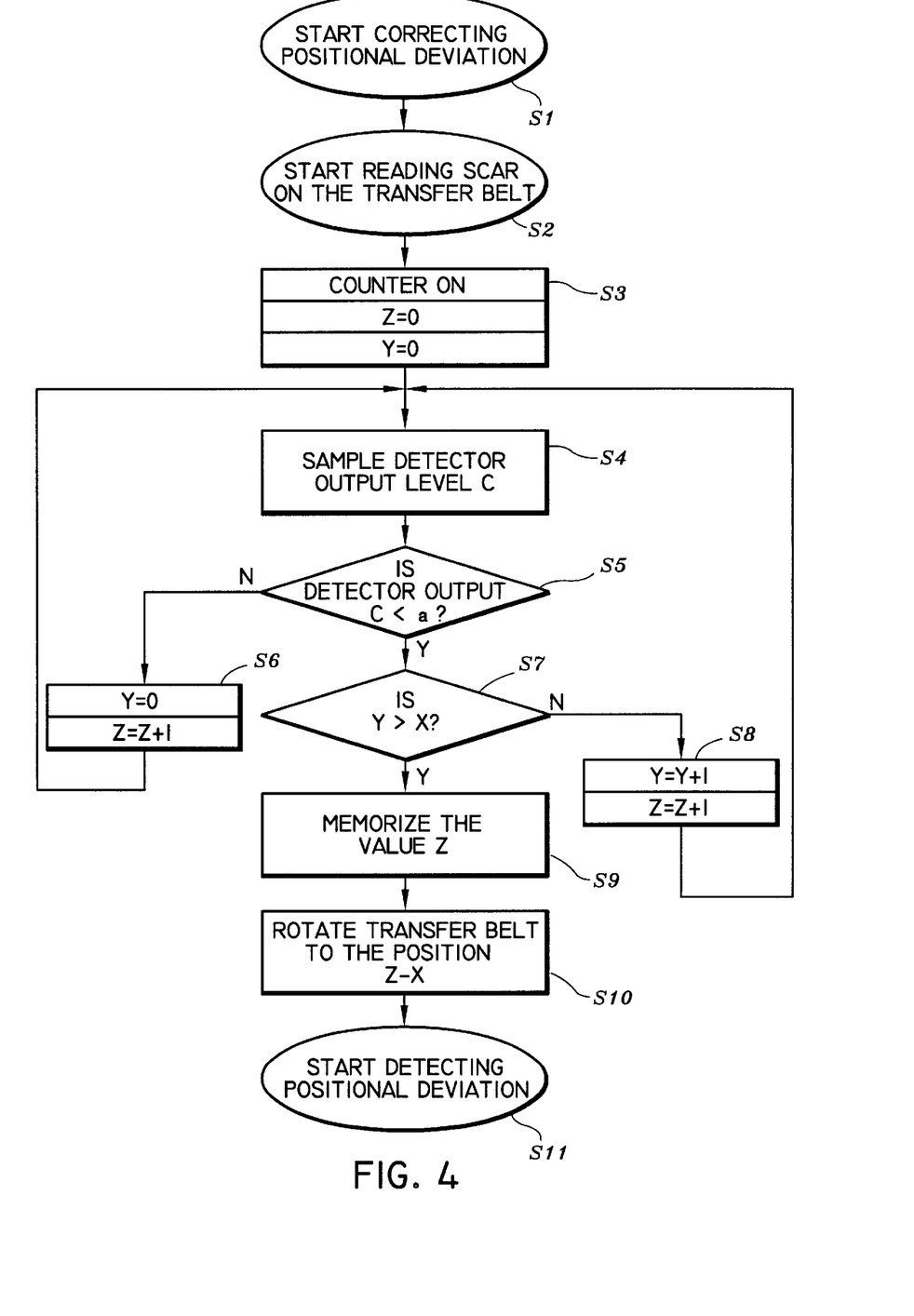
FIG. 4 is a flowchart explaining a correcting process used by the controller of FIG. 3 to correct a positional deviation.

Next, a process for correcting positional deviation by the controller 10 is explained with reference to FIG. 4.

When the process for correcting positional deviation starts (step S1), the process of reading a scar on the transfer belt 4 is started (step S2) by reading the transfer belt 4 with the detecting section 6 before starting the process of detecting positional deviation (step S11), which includes forming the positional deviation detecting pattern P for detecting positional deviation. The Y counter 12 and the Z counter 11 are reset to 0 at the same time (step S3), and then a process for sampling the output level C of the positional deviation detecting sensor 6 is executed (step S4).

Then, the output level C is compared by the controller 10 with a threshold level a, shown in FIG. 5a, for distinguishing between a predetermined proper signal and noise (step S5). The output level C is judged as indicating a scar if the answer is NO in step S5, and the Y counter 12, which measures or counts the distance Y in which no scars are present is reset to 0 (step S6). The Z counter 11, which measures or counts the distance moved Z of the transfer belt 4, increases by one (step S6). The program then returns to step S4 and the process of sampling the output level C of the positional deviation detecting sensor 6 is again executed.

Figure 5B:
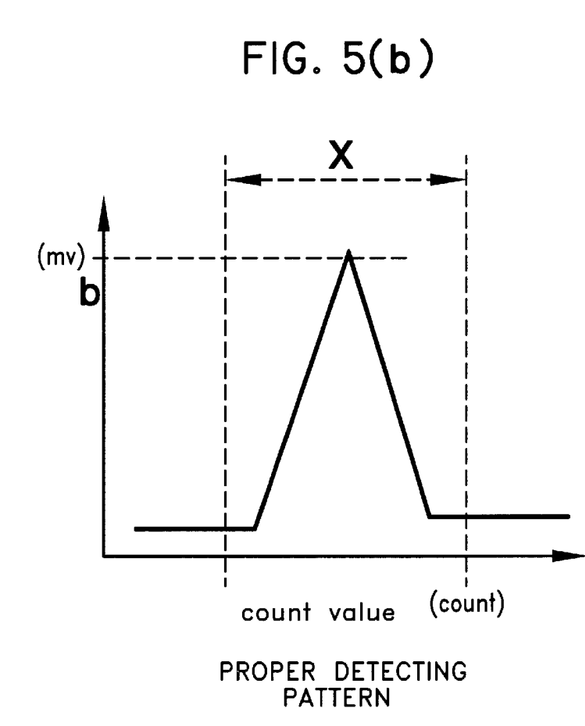
FIG. 5(b) shows a signal of a positional deviation detecting pattern detect by a positional deviation detecting sensor.

On the other hand, when the answer is YES at step S5, the output C is judged as indicating that there is no scar, and the controller 10 compares the value of the Y counter 12 with a predetermined length X of the positional deviation detecting pattern P, as shown in FIG. 5(b) (step S7). If Y is shorter than X, i.e., the distance Y in which there is no scar on the transfer belt 4 is shorter than the predetermined length X of the positional deviation detecting pattern P, the Y counter 12 and the Z 11 counter both increases by one (step S8). The program then returns to step S4 and the process of sampling the output level C of the positional deviation detecting sensor 6 is again executed.

If the output level C is lower than the threshold level a, and the distance Y is longer than the distance X, the value of the distance Z is stored in the memory 13, shown in FIG. 3, and the scar detecting process ends at this moment (step S9). Of course, if the distance Y is equal to the distance X, the value of the distance Z is stored in the memory 13 and the scar detecting process ends at this moment (step S9). Then the transfer belt 4 is advanced until the position Z-X is reached (almost one cycle) (step S10), and the positional deviation detecting process starts (step S11).

The positional deviation detecting process is explained hereinbelow.

The positional deviation detecting pattern P, which has the length X, is formed in an area between the position Z-X and the position Z, that is, an area with no scar. Then, the positional deviation detecting pattern P is detected by the positional deviation detecting sensor 6 with reference to the threshold level b, as shown in FIG. 5 (b), and the positional deviation is detected on the basis of the theoretical image forming timing, the image forming position of each color, and the actual position of the positional deviation detecting pattern P formed on the transfer belt 4. Any positional deviation of the colors is corrected/prevented according to the result of detecting the positional deviation, as described above.

According to the first embodiment, since the positional deviation detecting pattern P is formed at a portion of the transfer belt 4 having no scar, or a position where the positional deviation detecting pattern P can be distinguished from the noise even in the presence of a scar, any positional deviation can be detected accurately. Further, since the memory 13 only stores the distance moved Z of the transfer belt 4, which is measured or counted by the Z counter 11, a large-capacity memory is not required, and since the calculations are simple, a low-cost controller construction can be used to correct/prevent color deviations in multiple color image formation.

Second Embodiment

A second embodiment of the present invention is explained below, with reference to FIGS. 6 and 7.

Figure 6:
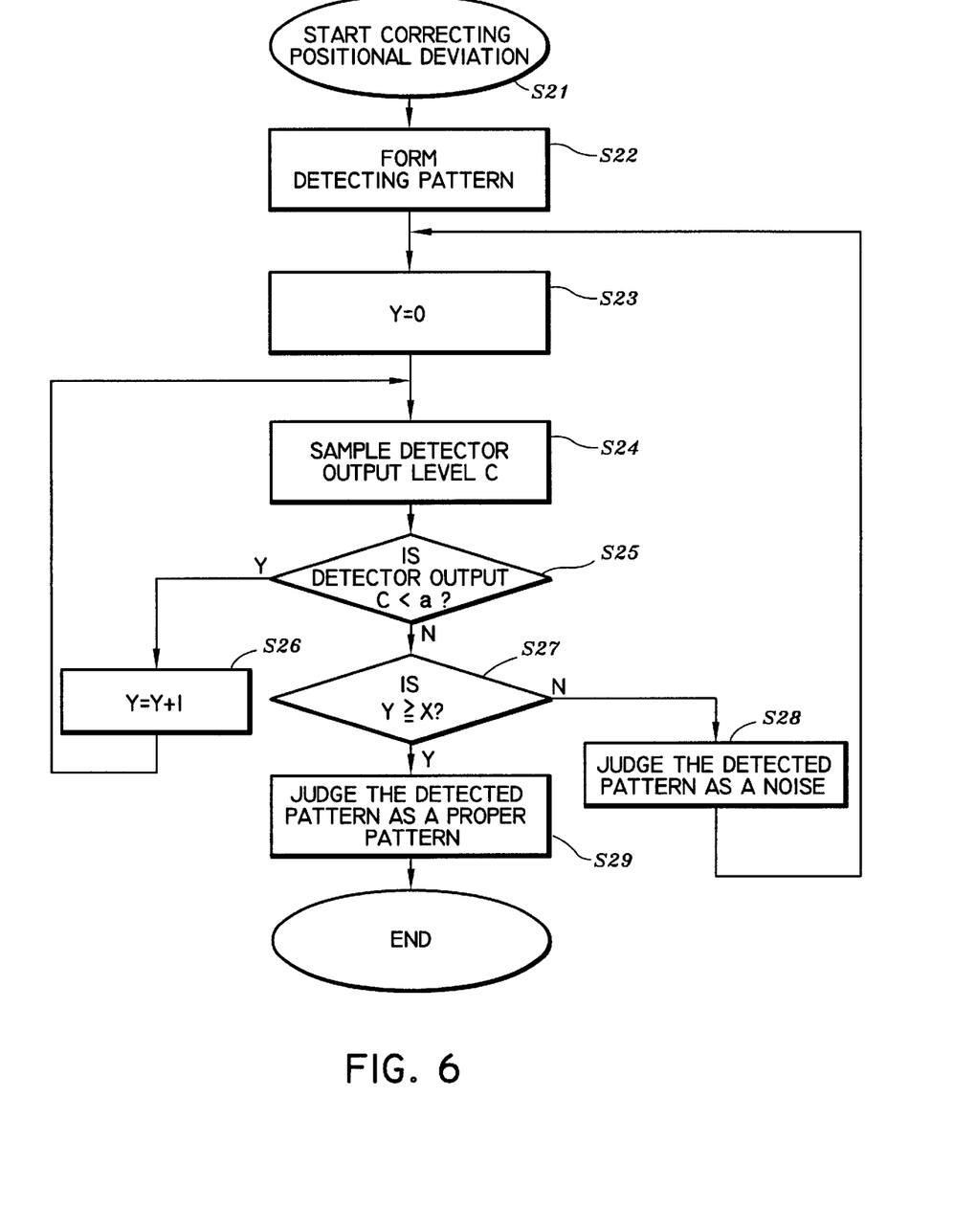
FIG. 6 is a flowchart explaining a correcting process for correcting a positional deviation according to a second embodiment of the present invention.

According to FIG. 6, the Y counter 12 counts or measures a distance of the transfer belt 4 for which a level C, obtained by reading the positional deviation detecting pattern P formed on the transfer belt 4, is equal to or higher than the threshold level a. Further, the Z counter 11 and the memory 13, which respectively measure and store the distance moved Z of the transfer belt 4, are not provided.

Basically, the sensor judges the area to have a roughness, such as a scar, when a fluctuation of the signal from the transfer belt 4 read by the sensor 6 continues for a period equal to or longer than a predetermined time period.

Figure 7A:
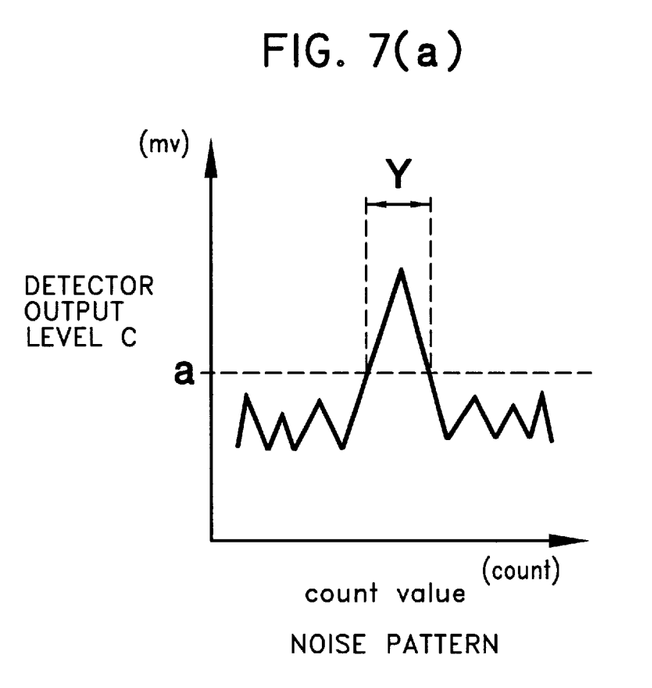
Figure 7B:
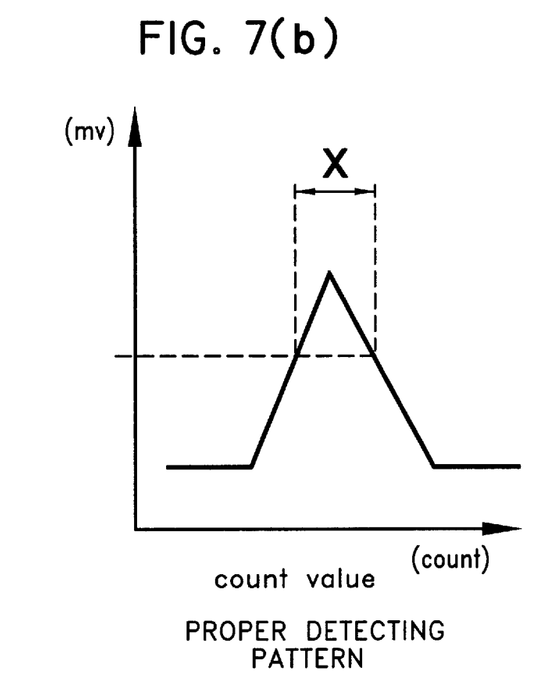
FIG. 7(b) shows a signal of the positional deviation detecting pattern detected by the positional deviation detecting sensor according to the second embodiment of the present invention.

When the process of correcting a positional deviation starts (step S21), the positional deviation detecting pattern P having a predetermined length X is formed on the transfer belt 4, as shown in FIG. 7 (b) (step S22). The Y counter 12 is reset to 0 (step S23), and then the process of sampling the output level C of the positional deviation detecting sensor 6 is started just before the positional deviation detecting pattern P passes the position of the positional deviation detecting sensor 6 (step S24). The output level C is compared with the threshold level a for distinguishing a predetermined proper signal from noise as shown in FIG. 7(a) (step S25), and when C>a, the Y counter 12 increases by one (step S26), and the program returns to step S24 so that the process of sampling the output level C of the positional deviation detecting sensor 6 is again executed.

On the other hand, when the result of the above comparison is not C>a in step S25, the value of the Y counter 12 is compared with the predetermined length X of the positional deviation detecting pattern P (step S27). When the result of this comparison is not $Y \geq X$ (NO in step S27), a detected pattern is judged to be noise (step S28), and the program returns to step S24. Then, the process of sampling the output level C of the positional deviation detecting sensor 6 is again executed. If the result of the above comparison is $Y \geq X$ (YES in step S27), the detected pattern is judged to be the positional deviation detecting pattern P (step S29), and the process of correcting the positional deviation ends. Then, the aforementioned positional deviation detecting process is executed.

According to the second embodiment, the positional deviation detecting pattern P is formed on the transfer belt 4, and in a case where the distance Y, for which the level C of the read value of the positional deviation detecting pattern P stays at a level equal to or higher than the threshold level a, has the same length as the predetermined length X of the positional deviation detecting pattern P, the detected pattern is judged to represent the positional deviation detecting pattern P. Therefore, positional deviation is accurately detected without requiring memory.

Third Embodiment

Figure 8:
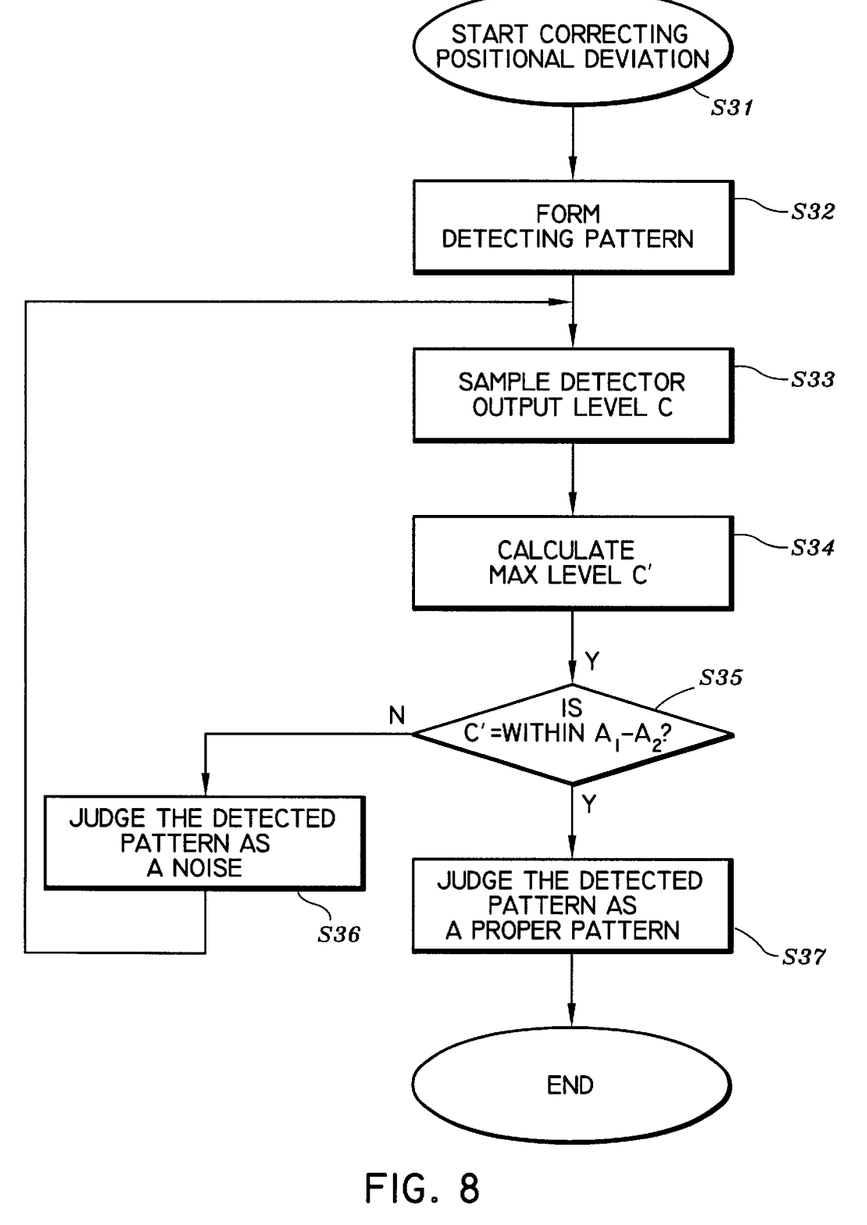
FIG. 8 is a flowchart explaining a correcting process for correcting a positional deviation according to a third embodiment of the present invention.

A third embodiment of the present invention is explained below, with reference to FIGS. 8 and 9.

When the process of correcting the positional deviation is started (step S31), the positional deviation detecting pattern P with the predetermined length X is formed on the transfer belt 4 in the same manner as described for the second embodiment (step S32). Then, the process of sampling the output level C by the positional deviation detecting sensor 6 is started just before the positional deviation detecting pattern P passes the position of the positional deviation detecting sensor 6 (step S33).

Figure 9A:
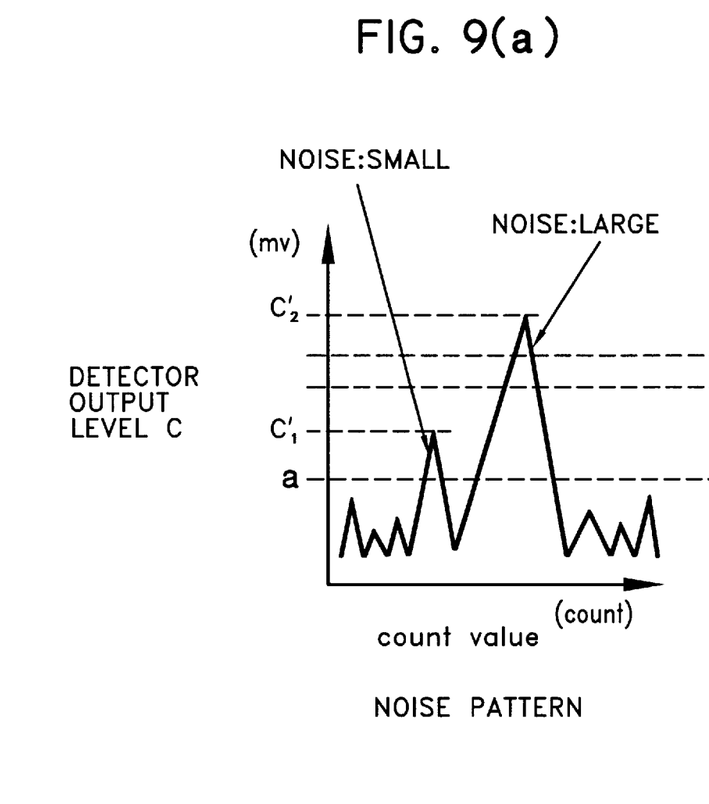
FIG. 9(a) shows a signal of a noise pattern detected by the positional deviation detecting sensor according to the third embodiment of the present invention.
Figure 9B:
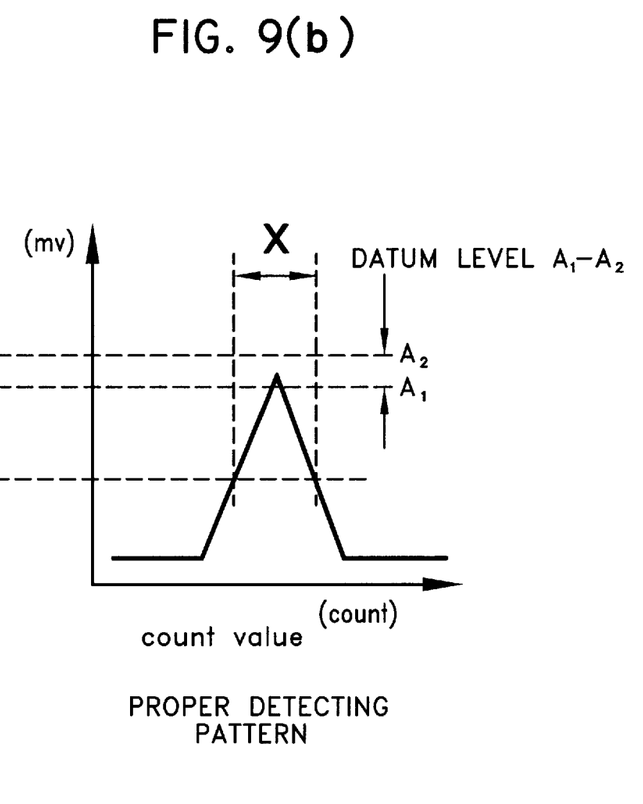
FIG. 9(b) shows a signal of the positional deviation detecting pattern detected by the positional deviation detecting sensor according to the third embodiment of the present invention.

In the third embodiment, maxima levels C' of the sampling level C are calculated as shown in FIG. 9(a) (step S34), and then the controller 10 judges whether or not the maxima levels $C'_1$ and $C'_2$ are within a data range $A_1$–$A_2$ in which a proper output level can be reached when the positional deviation detecting pattern P is detected, as shown in FIG. 9(b) (step S35). Further, if the maxima levels $C'_1$ and $C'_2$ are out of the data range $A_1$–$A_2$, ($C'_1 < A_1$, or $C'_2 > A_2$), the sampling level C is judged to represent noise (step S36). Then, the program returns to step S33 and the process of sampling the output level C of the positional deviation detecting sensor 6 is again executed. If the maxima levels $C'_1$ and $C'_2$ are within the data range $A_1$–$A_2$, ($A_1 \leq C'_1$ and $C'_2 \leq A_2$) in step S35, the sampling level C is judged to represent a proper detecting signal for the positional deviation detecting pattern P (step S37). Then, the process of correcting the positional deviation ends and the aforementioned positional deviation detecting process is executed using the pattern P (not shown), if the time period during which the sampling level C is judged to represent the proper detecting signal for the positional deviation detecting pattern P lasts for the predetermined length X of the positional deviation detecting pattern P.

According to the third embodiment, the process of detecting the positional deviation is executed by judging a detecting pattern to represent the positional deviation detecting pattern P according to whether the maximum level C' of the sampling level C exists within a data range $A_1$ through $A_2$ in which the proper output level can be reached when the pattern P is detected. Accordingly, the positional deviation is accurately detected without requiring memory.

Fourth Embodiment

Figure 10:
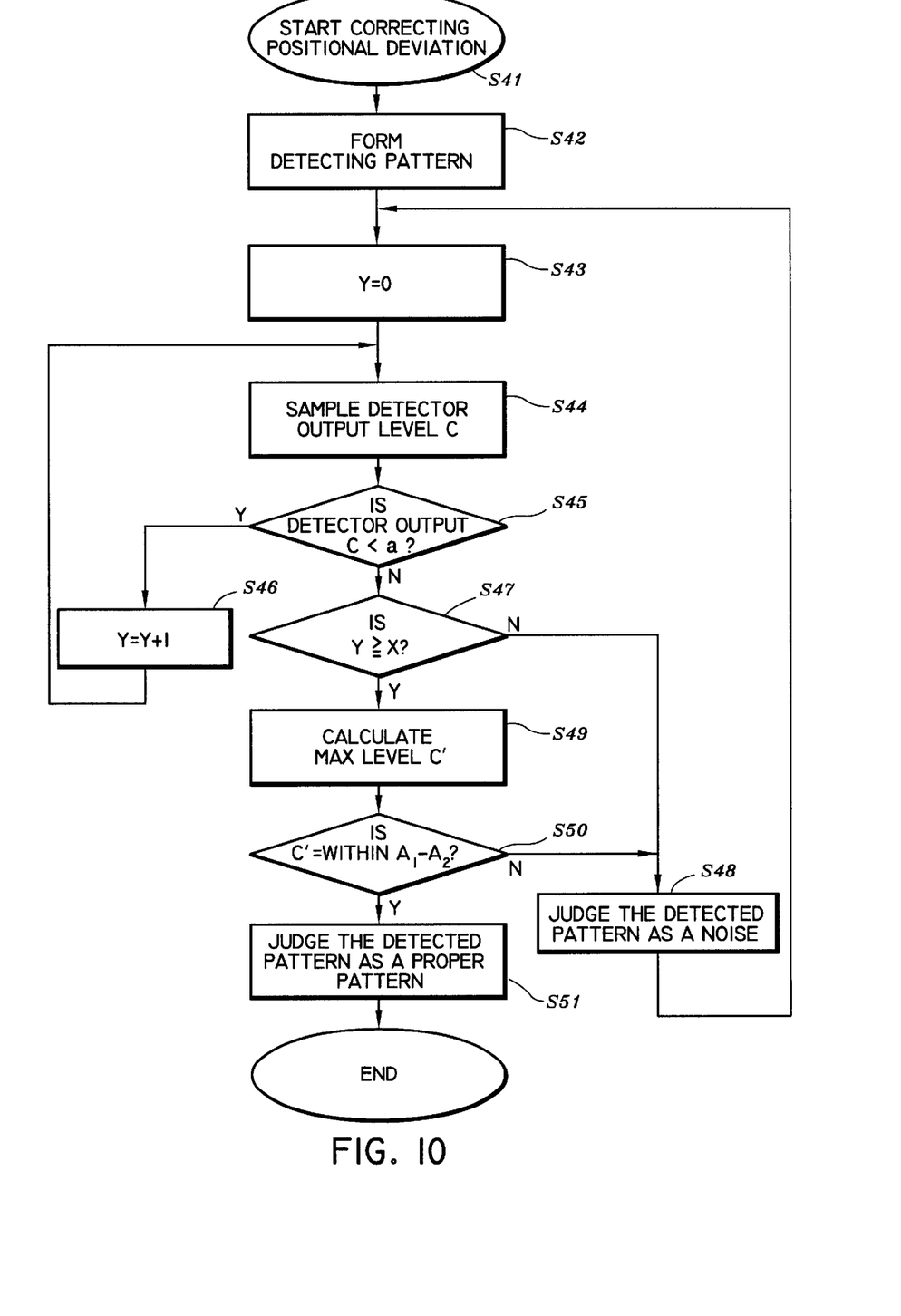
FIG. 10 is a flowchart explaining a correcting process for correcting a positional deviation according to a fourth embodiment of the present invention.

A fourth embodiment of the present invention is explained below, with reference to FIGS. 10 and 11.

When the process of correcting the positional deviation starts (step S41), in the same manner as described for the second embodiment, the positional deviation detecting pattern P having a predetermined length X is formed on the transfer belt 4 (step S42). The Y counter 12 is reset to 0 (step S43), and then the process of sampling the output level C of the positional deviation detecting sensor 6 is started just before the positional deviation detecting pattern P passes the position of the positional deviation detecting sensor 6 (step S44).

Figure 11:
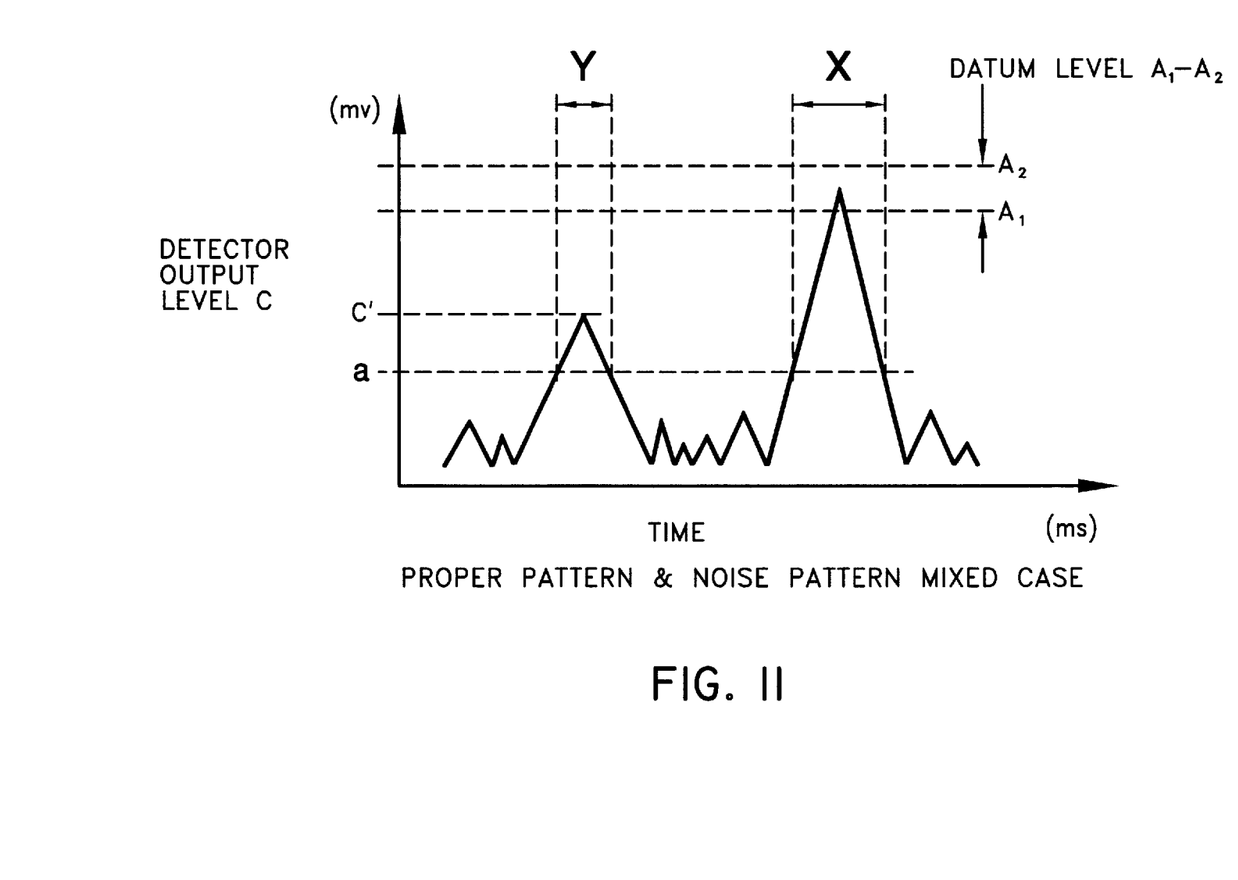
FIG. 11 shows a signal of a noise pattern and a positional deviation detecting pattern detected by the positional deviation detecting sensor according to the fourth embodiment of the present invention.

The output level C is compared with the threshold level a to distinguish a predetermined proper signal from noise (step S45), as shown in FIG. 11. If C>a, the Y counter 12 increases by one (step S46), and then the program returns to step S44 and the process of sampling the output level C of the positional deviation detecting sensor 6 is again executed. On the other hand, if the answer is NO in step S45, the value of the Y counter 12 is compared with the predetermined length X of the positional deviation detecting pattern P (step S47). If the answer is NO in step S47 (Y≧X?), the detected pattern is judged to represent noise (step S48), and the program returns to step S43, and the Y counter 12 is reset to 0, and then the process of sampling the output level C of the positional deviation detecting sensor 6 is again executed.

Further, if Y≧X in step S47, the maximum level C' of the sampling level C is calculated (step S49) in the same manner as described for the third embodiment, and then the maximum level C' is judged to determine whether it is within the data range $A_1$–$A_2$ ($A_1 \leq C' \leq A_2$) in which the proper output level can be reached (step S50). If the maximum level C' is outside of the data range $A_1$–$A_2$ (C'<$A_1$, or C'>$A_2$), the detected pattern is judged to represent noise (step S48), and the program returns to step 43. The Y counter 12 is reset to 0 and then the process of sampling the output level C of the positional deviation detecting sensor 6 is again executed. If $C'_n$ is within the data range $A_1$–$A_2$ ($A_1 \leq C'_n \leq A_2$), the detected pattern is judged to represent a positional deviation detecting pattern P (step S51), and the process of correcting the positional deviation ends and then the aforementioned positional deviation detecting process is executed.

According to the fourth embodiment, the positional deviation detecting pattern P is formed on the transfer belt 4, and the distance Y, for which the level C corresponding to the pattern P remains at a level equal to or higher than the threshold level a, lasts for the predetermined length X of the positional deviation detecting pattern P in the same manner as described for the second embodiment, the positional deviation detecting process is executed by judging a detected pattern as the positional deviation detecting pattern P according to whether the maximum level C' of the sampling level C is within the data range $A_1$–$A_2$ in which the proper output level can be reached when the pattern is detected, as described for the third embodiment. Therefore, positional deviation is more accurately detected without requiring memory.

This invention may be conveniently implemented using a conventional general purpose digital computer or microprocessor programmed according to the teachings of the present specification, as will be apparent to those skilled in the computer arts. Appropriate software coding can readily be prepared by skilled programmers based on the teachings of the present disclosure, as will be apparent to those skilled in the software arts. The invention may also be implemented by the use of application-specific integrated circuits or by interconnecting an appropriate network of conventional component circuits, as will be readily apparent to those skilled in the art.

Obviously, numerous modifications to and variations of the present invention are possible in light of the above teachings. It is therefore to be understood that within the scope of the appended claims, the invention may be practiced otherwise than as specifically described herein.

Having now fully described the invention, it will be apparent to one of ordinary skill in the art that many changes and modifications can be made thereto without departing from the spirit and scope of the invention as set forth herein.

This application is based on Japanese Patent Application No. 08-231037, filed on Aug. 30, 1996, the entire contents of which is herein incorporated by reference.

What is claimed is:

1. A color image forming apparatus for superimposing images formed on a plurality of photoconductive elements onto a copy sheet, the apparatus comprising:
   a sensor for reading a transfer member and a positional deviation detecting pattern formed on the transfer member;
   a memory for storing information relating to an area of the transfer member having no roughness such as a scar thereon;
   a detector for detecting the area having no roughness on the basis of a signal read by the sensor and for causing the memory to store therein the information relating to the area; and
   a color deviation corrector for correcting a color deviation on the basis of a signal generated by the sensor reading the positional deviation detecting pattern, wherein the positional deviation detecting pattern is formed at the area of the transfer member having no roughness.

2. A color image forming apparatus for superimposing images formed on a plurality of photoconductive elements onto a copy sheet, the apparatus comprising:
   a sensor for reading a transfer member and a positional deviation detecting pattern formed on the transfer member;
   a judging device for forming the positional deviation detecting pattern on the transfer member and for determining a signal-generating length of the transfer member for which a level of the signal read by the sensor is equal to or higher than a predetermined level, wherein the signal is judged to represent noise when the determined signal-generating length is shorter than a length of the positional deviation detecting pattern formed on the transfer member, and the signal is judged to represent a proper positional deviation detecting pattern when the determined signal-generating length is equal to or longer than the length of the positional deviation detecting pattern formed on the transfer member; and
   a color deviation corrector for correcting a color deviation on the basis of the signal read from an area of the transfer member representing the proper positional deviation detecting pattern.

3. A color image forming apparatus for superimposing images formed on a plurality of photoconductive elements onto a copy sheet, the apparatus comprising:
   a sensor for reading a transfer member and a positional deviation detecting pattern formed on the transfer member;
   a judging device for forming the positional deviation detecting pattern on the transfer member, determining a maximum level of a signal read by the sensor, and judging whether the determined maximum level is within a data range for a proper signal level, wherein the signal is judged to represent noise when the determined maximum level is not within the data range for a proper signal, and the signal read by the sensor is judged to represent a proper positional deviation detecting pattern when a length of the signal is equal to or longer than a length of the positional deviation detecting pattern on the transfer member; and
   a color deviation corrector for correcting a color deviation on the basis of the signal read from an area of the transfer member representing the proper positional deviation detecting pattern.

4. A color image forming apparatus as claimed in claim 3, wherein the judging device determines a signal-generating length of the transfer member for which a level of the signal read by the sensor is equal to or higher than a predetermined level, and the signal is judged to represent noise when the determined signal-generating length is shorter than the length of the positional deviation detecting pattern formed on the transfer member.

5. A color image forming apparatus for superimposing images formed on a plurality of photoconductive elements onto a copy sheet, the apparatus comprising:

means for reading a transfer member and a positional deviation detecting pattern formed on the transfer member;

means for storing information relating to an area of the transfer member having no roughness such as a scar thereon;

means for detecting the area having no roughness on the basis of a signal read by the sensor and for causing the memory to store therein the information relating to the area; and means for correcting a color deviation on the basis of a signal generated by the sensor reading the positional deviation detecting pattern, wherein the positional deviation detecting pattern is formed at the area of the transfer member having no roughness.

6. A color image forming apparatus for superimposing images formed on a plurality of photoconductive elements onto a copy sheet, the apparatus comprising:

means for reading a transfer member and a positional deviation detecting pattern formed on the transfer member;

judging means for forming the positional deviation detecting pattern on the transfer member and for determining a signal-generating length of the transfer member for which a level of a signal read by the means for reading is equal to or higher than a predetermined level, wherein the signal is judged to represent noise when the determined signal-generating length is shorter than a length of the positional deviation detecting pattern formed on the transfer member, and the signal is judged to represent a proper positional deviation detecting pattern when the determined signal-generating length is equal to or longer than the positional deviation detecting pattern formed on the transfer member; and means for correcting a color deviation on the basis of the signal read from an area of the transfer member representing the proper positional deviation detecting pattern.

7. A color image forming apparatus for superimposing images formed on a plurality of photoconductive elements onto a copy sheet, the apparatus comprising:

means for reading a transfer member and a positional deviation detecting pattern formed on the transfer member;

judging means for forming the positional deviation detecting pattern on the transfer member, determining a maximum level of a signal read by the means for reading, and judging whether the determined maximum level is within a data range for a proper signal level, wherein the signal is judged to represent noise when the determined maximum level is not within the data range for a proper signal level, and the signal read by the means for reading is judged to represent a proper positional deviation detecting pattern when a length of the signal is equal to or longer than a length of the positional deviation detecting pattern on the transfer member; and means for correcting a color deviation on the basis of the signal read from an area of the transfer member representing the proper positional deviation detecting pattern.

8. A color image forming apparatus as claimed in claim 7, wherein the judging means determines a signal-generating length of the transfer member for which a level of the signal read by the means for reading is equal to or higher than a predetermined level, and the signal is judged to represent noise when the determined signal-generating length is shorter than the length of the positional deviation detecting pattern formed on the transfer member.

9. A method for preventing positional deviation in a color image forming apparatus for superimposing images formed on a plurality of photoconductive elements onto a copy sheet, the method comprising the steps of:

reading a transfer member and a positional deviation detecting pattern formed on the transfer member and generating a signal;

storing information relating to an area having no roughness on the transfer member;

detecting the area having no roughness on the basis of the signal; and correcting a color deviation on the basis of the signal generated by reading the positional deviation detecting pattern, wherein the positional deviation detecting pattern is formed at the area of the transfer member having no roughness.

10. A method for preventing positional deviation in a color image forming apparatus for superimposing images formed on a plurality of photoconductive elements onto a copy sheet, the method comprising the steps of:

forming a positional deviation detecting pattern on a transfer member;

reading the transfer member and the positional deviation detecting pattern formed on the transfer member and generating a signal;

determining a signal-generating length of the transfer member for which a level of the signal is equal to or higher than a predetermined level;

judging the signal-generating length to represent noise when the signal-generating length is shorter than a length of the positional deviation detecting pattern on the transfer member;

judging the signal-generating length to represent a proper positional deviation detecting pattern when the signal-generating length is equal to or longer than the length of the positional deviation detecting pattern on the transfer member;

and correcting a color deviation when the signal is judged to represent the proper positional deviation detecting pattern.

11. A method for preventing positional deviation in a color image forming apparatus for superimposing images formed on a plurality of photoconductive elements onto a copy sheet, the method comprising the steps of:

forming a positional deviation detecting pattern on a transfer member;

reading the transfer member and the positional deviation detecting pattern formed on the transfer member and generating a signal;

calculating a maximum level of the signal;

judging whether the maximum level is within a data range for a proper signal level;

judging the maximum level to represent noise when the maximum level is not within the data range;

judging the signal to represent a proper positional deviation detecting signal when the maximum level is within the data range;

judging the signal to represent a proper positional deviation detecting pattern when a signal-generating length of the signal representing the proper positional deviation detecting pattern is equal to or longer than a length of positional deviation detecting pattern on the transfer member;

and correcting a color deviation when the signal is judged to represent the proper positional deviation detecting pattern.

12. A method for preventing a positional deviation in a color image forming apparatus for superimposing images formed on a plurality of photoconductive elements onto a copy sheet; the method comprising the steps of:

reading a transfer member and a positional deviation detecting pattern formed on the transfer member and generating a signal;

determining a signal-generating length of the transfer member for which a signal level is equal to or higher than a predetermined level;

judging the signal to represent noise when the signal-generating length of the transfer member is shorter than a length of the positional deviation detecting pattern on the transfer member;

calculating a maximum level of the signal when the signal-generating length of the transfer member is equal to or longer than the length of the positional deviation detecting pattern of the transfer member;

judging whether the maximum level of the signal is within a data range for a proper signal level;

judging the maximum level of the signal to represent noise when the maximum level is not within the data range;

judging the maximum level of the signal to represent a proper positional deviation detecting signal when the maximum level is within the data range, wherein the signal is judged to represent a proper positional deviation detecting pattern when the signal-generating length of the signal is equal to or longer than the length of the positional deviation detecting pattern on the transfer member; and correcting a color deviation when the signal is judged to represent the proper positional deviation detecting pattern.

* * * * *